United States Patent [19]

Hales

[11] Patent Number: 4,583,411
[45] Date of Patent: Apr. 22, 1986

[54] DYNAMIC TORQUE MONITORING DEVICE

[75] Inventor: James W. Hales, Harrison, Tenn.

[73] Assignee: Combustion Engineering, Inc., Windsor, Conn.

[21] Appl. No.: 583,930

[22] Filed: Feb. 27, 1984

[51] Int. Cl.⁴ ............................................. G01L 3/22
[52] U.S. Cl. ............................. 73/862.09; 73/862.18; 73/1 C
[58] Field of Search ............... 73/1 C, 862.08, 862.09, 73/862.13, 862.16, 862.17, 862.18

[56] References Cited

U.S. PATENT DOCUMENTS

| | | | |
|---|---|---|---|
| 1,926,825 | 9/1933 | Takahashi | 73/862.09 |
| 2,642,740 | 6/1953 | Stephenson et al. | 73/862.17 |
| 2,744,409 | 5/1956 | Wintle, Jr. et al. | 73/862.17 |
| 2,845,795 | 8/1958 | Emmerling | 73/862.17 |
| 2,978,901 | 4/1961 | Sunberg | 73/862.17 |
| 3,377,849 | 4/1968 | Lebow | 73/862.09 X |
| 4,150,559 | 4/1979 | Levy | 73/1 C |

FOREIGN PATENT DOCUMENTS 0678348  8/1979  U.S.S.R. ................. 73/1 C

Primary Examiner—Charles A. Ruehl
Attorney, Agent, or Firm—David L. Smith

[57] ABSTRACT

A method and apparatus for dynamically testing a rotational torque producing device (22) during calibration under conditions simulating actual operating conditions. The torque produced by the torque producing device under controlled (28) load conditions similar to actual operating conditions is converted by a transducer (12) to an electrical signal and monitored (26) to assure that the stall torque of torque producing device (22) is within an acceptable band.

5 Claims, 7 Drawing Figures

DYNAMIC TORQUE MONITORING DEVICE

BACKGROUND OF THE INVENTION

This invention relates to testing rotational torque producing devices and in particular to a method and apparatus for dynamically testing a rotational torque device under conditions simulating actual operating conditions.

A heat exchanger in a nuclear steam supply system extracts heat from a closed primary loop fluid that circulates through the reactor and the heat exchanger and transfers that heat to a closed secondary loop fluid that circulates through the heat exchanger and a steam turbine. The heat exchanger is comprised of a vessel containing a plurality of tubes around which the fluid of the primary loop passes and through which the fluid of the secondary loop circulates. Although the two fluids are in heat exchange relationship, it is imperative to maintain the fluids of the two loops isolated one from the other. Over the life of the nuclear steam supply system, some of the tubes of the heat exchanger deteriorate. During outages, the tubes of the heat exchanger are nondestructively tested to ascertain which tubes, if any, should be removed from service to assure the integrity of the heat exchanger.

One method of removing a heat exchanger tube from service is to plug both ends of the tube. One method of plugging a tube includes inserting a plug having an outside diameter less than the inside diameter of the tube being plugged. The plug is expanded by rolling the inner surface of the plug forming a mechanical rolled joint. The plug may be rolled either manually or automatically by use of remote installation equipment.

The rolling equipment is designed to stall at a predetermined torque. The integrity of the mechanical rolled joint is inferred from the torque at which the rolling equipment stalls. The rolling equipment is calibrated periodically to ensure a consistent, acceptable rolled joint.

Commercial equipment designed to calibrate rolling equipment to assure that the stall torque remains within an acceptable tolerance band either operates by running the torque producing device up to an operating speed and having a sudden stop or by coupling the torque producing device directly to a rigid torque measuring device and energizing the torque producing device. Neither of the commercial torque measuring devices provide acceptable calibration of the torque producing device for expanding plugs to form a mechanical rolled joint. In running the torque producing device up to speed then suddenly stopping the torque producing device, any measured torque is comprised of both the torque produced by the device and the rotational inertia of the torque producing device. Starting a torque producing device against an infinite load while monitoring the torque produced does not provide an indication of the stall torque but rather an indication of the starting torque of the torque producing device.

A method and apparatus for testing the stall torque produced by a torque producing device under conditions which are similar to actual operating conditions is needed. Such a method and apparatus would permit calibration of rotational torque producing devices such that when a calibrated torque producing device is used to produce a mechanical rolled joint the integrity of the mechanical rolled joint may be consistently and reliably inferred from the calibration of the rotational torque device.

SUMMARY OF THE INVENTION

The present invention provides an improvement over the prior art calibration techniques in that the rotational torque producing device is tested under loading conditions that are similar to actual operating conditions when producing a mechanical rolled joint. In accordance with the present invention, the torque producing device is coupled with a rotational loading device. The rotational loading device is mounted on a rigidly supported reactional load transducer. The stationary portion of the torque producing device is maintained in a fixed position relative to the reactional load transducer. The torque producing device is energized causing the rotating portion to rotate the reactional loading device thereby loading the reactional load transducer to the extent necessary to overcome friction. The output of the reactional load transducer is monitored and provides an indication of the torque produced by the torque producing device. The torque produced by the torque producing device is monitored as the load thereon is increased at a preselected rate by controlling the reactional load transducer until the torque producing device stalls. The torque producing device, typically an air motor, may be repetitively subjected to the same loading rate to ensure consistent, acceptable calibration. The rate at which the load on the reactional load transducer is increased can be varied to decrease the effects of rotational inertia as various torque producing devices with varying rotating masses are calibrated. In this manner, the effects of rotating inertia are minimized while calibrating the stall torque of the torque producing device under conditions similar to actual operating conditions.

DESCRIPTION OF THE PREFERRED EMBODIMENT

Figure 1:
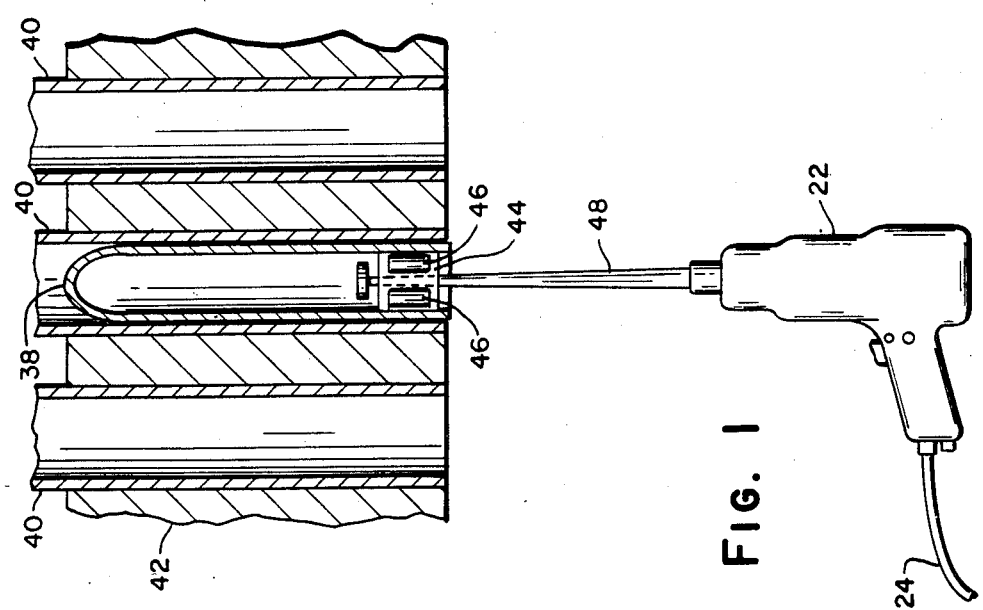
FIG. 1 is a side view, partially in section, of a plug after insertion into a tube and before the mechanical rolled joint is formed with the torque producing device in an initial position.
Figure 2:
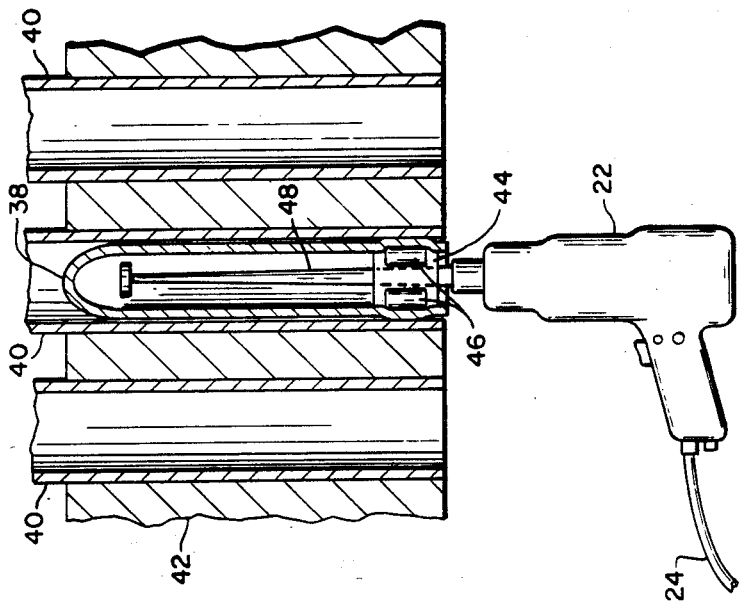
FIG. 2 is a side view, partially in section, of a plug inserted into a tube after the mechanically rolled joint has been completed with the rotational torque device in a final position.

Referring to the drawing, there is depicted in FIGS. 1 and 2 the installation of a tube plug including forming a mechanically rolled joint. FIG. 1 of the drawing shows a tube plug 38 of outside diameter slightly smaller than the inside diameter of tube 40 inserted within tube 40 in the region of tube sheet 42 prior to forming a mechanically rolled joint. A cage 44 containing rollers 46 and engaging tapered mandrel 48 is inserted into tube plug 38. Air gun 22 is energized rotating tapered mandrel 48 causing rollers 46 to ride up tapered mandrel 48 thereby deforming tube plug 38 in the region of rollers 46 forming the mechanically rolled joint. As the rollers ride up tapered mandrel 48 the load on air gun 22 increases substantially uniformly until air gun 22 stalls at which time it may be inferred that the mechanically rolled joint is complete as shown in FIG. 2. The air motor of air gun 22 is reversed and the roller-cage-mandrel assembly withdrawn from tube plug 38.

Figure 3:
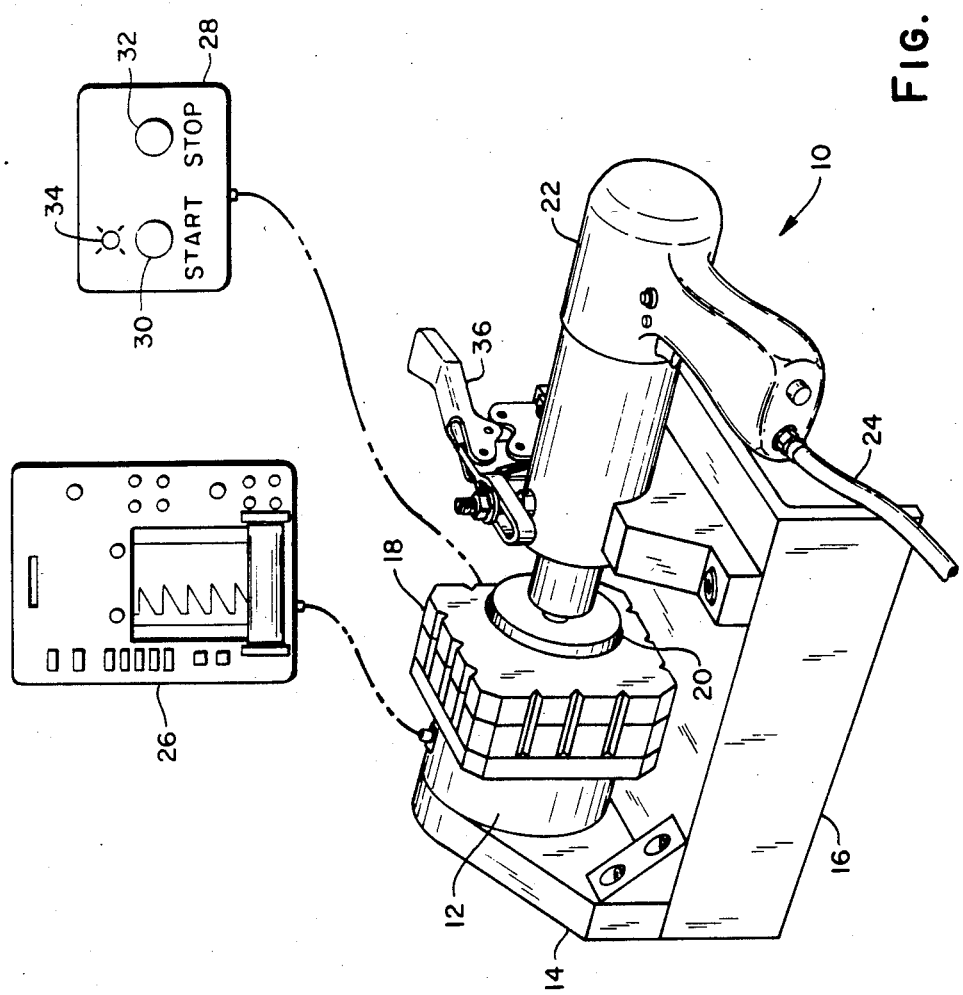
FIG. 3 is a partial perspective, partial schematic of the dynamic torque monitoring device designed in accordance with the present invention.

Referring to FIG. 3 of the drawing, there is depicted therein a dynamic torque monitoring device 10 in accordance with the present invention for dynamically testing a rotational torque device under conditions similar to producing a mechanically rolled joint. Reactional load transducer 12 is rigidly supported at one end by mounting plate 14 which in turn is rigidly supported by C channel base 16. Rotational loading device 18, typically a magnetic particle brake, is cooperatively mounted on the other end of reactional load transducer 12. Adapter 20 provides a coupling means between rotational loading device 18 and the torque producing device 22, typically an air gun, that is compatible with the chuck of torque producing device 22. Air gun 22 is driven by air supplied by air line 24. The torque developed by air gun 22 is transmitted through magnetic particle brake 18, which is free to rotate, thereby transmitting the torque produced by air gun 22 to reactional load transducer 12. Reactional load transducer 12 senses the torque produced by air gun 22 and produces a signal indicative of the torque developed by air gun 22 that is recorded on recorder 26. The record of torque during calibration of air gun 22 as provided by recorder 26 may be retained for archive purposes including review by regulatory agencies.

Control panel 28 contains start push button 30, stop push button 32, indicating means 34 and circuitry, discussed below, to control the rate at which the magnetic particle brake loads air gun 22. Although air gun 22 could be manually held during a dynamic test under conditions simulating actual operating conditions, any rotation of air gun 22 introduces an error into the test results. Therefore, it is preferred that the non-rotating portion of the air gun 22 be maintained stationary relative thereto C channel base 16 by cam lock 26 supported from C channel base 16. This assures that no error is introduced into the recorded test results by maintaining the non-rotating portion of air gun 22 stationary relative to reactional load transducer 12.

Figure 4:
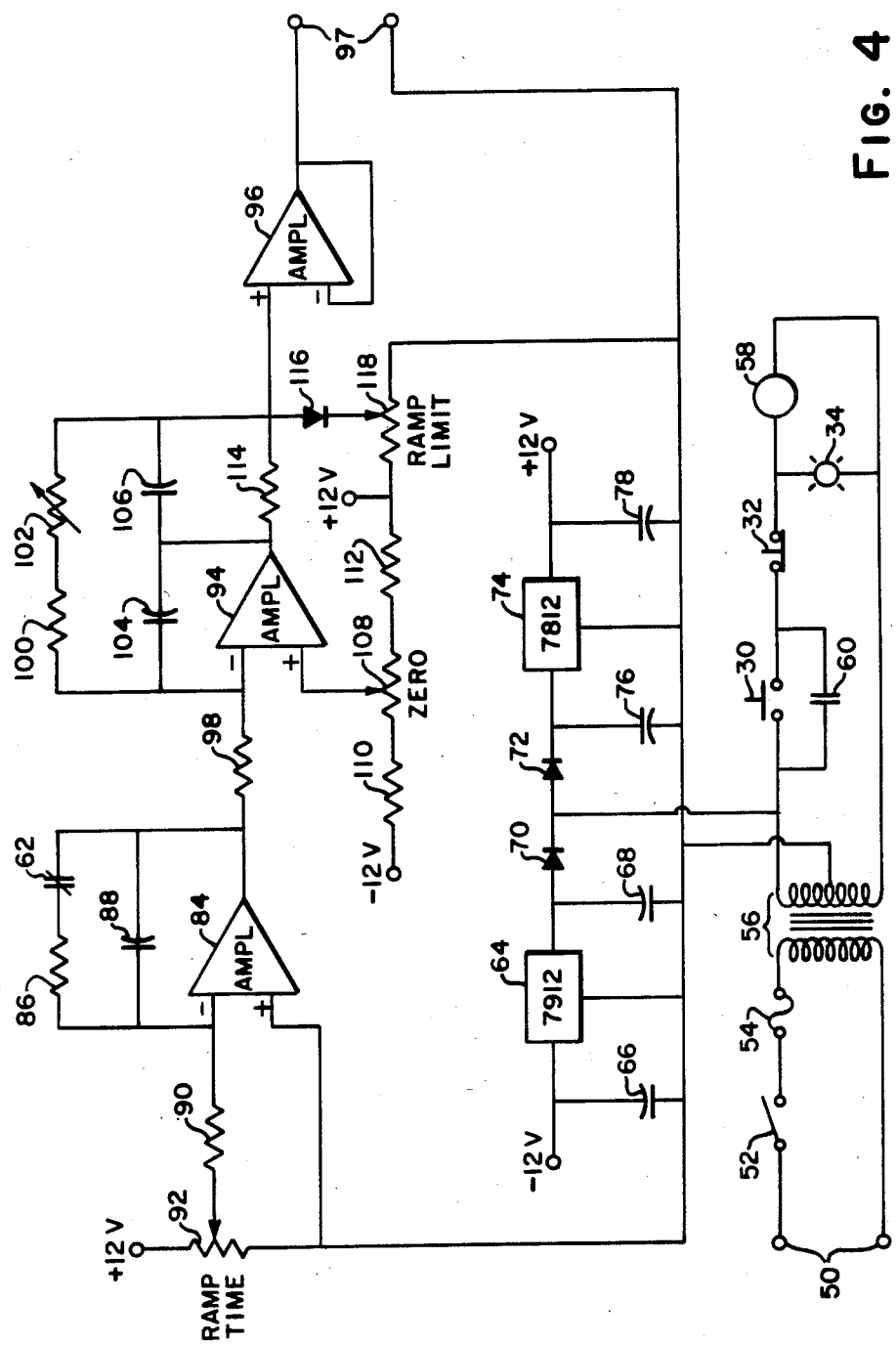
FIG. 4 is a schematic diagram of the ramp generating circuit used to control the rate at which the rotational loading device is loaded.

The control circuit contained in control panel 28 which provides a control signal to rotational loading device 18 thereby controlling the load on air gun 22 during stall torque calibration testing is shown as FIG. 4. Power is supplied to the control circuit through terminals 50, on/off switch 52, fuse 54 and step down transformer 56. The secondary winding of transformer 56 is a 24 volt center tapped or 12 volt each side of center winding. A ramp loading of air gun 22 is initiated by depressing start push button 30 which in turn energizes relay 58 and indicator 34. Energizing relay 58 closes normally open contact 60 of relay 58 and seals in the circuit energizing relay 58. Simultaneously, normally closed contact 62, the function of which will be discussed below, is opened.

Voltage regulator 64 is a model number 7912 voltage regulator providing a negative 12 volt dc output. Capacitors 66, a 0.1 microfarad capacitor, and 68, a 1000 microfarad capacitor filter the output and input of voltage regulator 64. Diode 70 provides only the negative half wave as the input to voltage regulator 64. Similarly, diode 72 provides only the positive half wave as an input to voltage regulator 74. Voltage regulator 74 is a model number 7812 voltage regulator that provides a positive 12 volt dc output. The input to voltage regulator 74 is filtered by capacitor 76, a 1000 microfarad capacitor; the output of voltage regulator 74 is filtered by capacitor 78, a 0.1 microfarad capacitor. The +12 volt and −12 volt outputs of voltage regulators 74 and 64, respectively, are used in the circuit as indicated.

Figure 5:
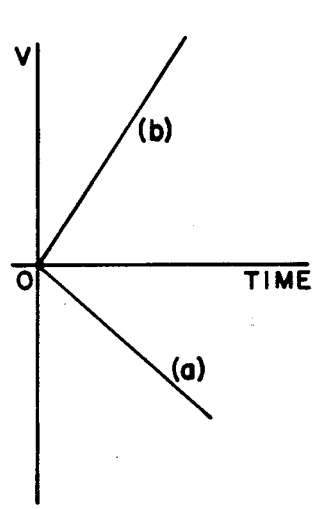
FIG. 5 is the voltage developed at two intermediate points in the schematic of FIG. "4"

The control signal provided to rotational loading device 18 is generated in a three stage amplifier circuit. Amplifier 84 in the first stage operates as an integrator. As stated above, loading rotational loading device 18 is initiated by depressing start push button 30 which in turn opens normally closed contact 62. Opening normally closed contact 62 provides a step change in the voltage applied to the negative input terminal of amplifier 84. With resistor 86, a 4.7 kilohm resistance removed from the feedback circuit, amplifier 84 is an integrator with capacitor 88, a 10 microfarad capacitor, as the feedback capacitance and resistor 90, a 1 megaohm resistance as the input resistance. The positive input terminal of amplifier 84 is grounded. The output of amplifier 84 is a ramp with a negative slope as shown in curve (a) of FIG. 5. The slope of the output from amplifier 84, an inverting amplifier, may be varied by varying the setting of ramp time potentiometer 92, a 25 kilohm potentiometer.

The second stage of the three stage amplifier circuit is an inversion and filter circuit. Amplifier 94 inverts the signal received from amplifier 84 and provides an input to amplifier 96. Resistor 98 is a 47 kilohm input resistance to the negative input terminal of amplifier 94. The feedback resistance is comprised of resistor 100, a 47 kilohm resistance in series with potentiometer 102, a 250 kilohm resistance. Potentiometer 102 permits the gain of the second stage to be varied. Capacitors 104 and 106 are in series with each other and in parallel with the series combination of resistor 100 and potentiometer 102. In addition, the common point between capacitors 104 and 106 is tied to the output of amplifier 94. Capacitor 104 is a 0.002 microfarad feedback capacitor that limits the upper frequency response of the second stage so as to filter out high frequency noise. Capacitor 106 is a 0.01 microfarad capacitor that filters out low frequency noise. The positive input terminal of amplifier 94 is connected to the wiper of zero adjustment potentiometer 108. Potentiometer 108 is between resistors 110 and 112, each 12 kilohm resistances. A total of 24 volts is dropped across this series of three resistances, the 24 volts spanning from +12 volts to −12 volts. The zero adjustment of amplifier 94 was designed in the above-described manner rather than dropping 24 volts across a potentiometer containing the entire resistance because the zero offset is not expected to exceed the voltage drop across potentiometer 108. The output ramp voltage of amplifier 94 is shown as curve (b) of FIG. 5.

Figure 6:
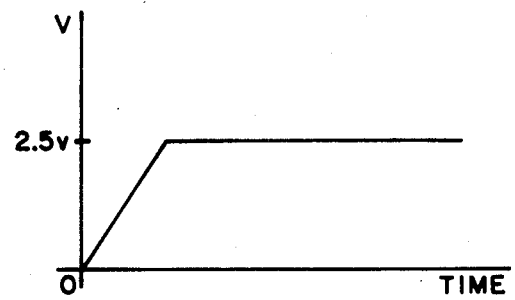
FIG. 6 is the output voltage developed by the schematic of FIG. "4"

Amplifier 96, a unity gain buffer, is the third stage of the amplifier circuit. The negative input to amplifier 96 is a direct feedback of the output of amplifier 96 which is the control signal provided to rotational loading device 18. The positive input signal for amplifier 96 is received fom the output of amplifier 94 through resistor 114, an 8.2 kilohm resistance. The positive input to amplifier 96 is also tied to capacitor 106 and the anode of clamping diode 116. The cathode of clamping diode 116 connects to the wiper of ramp limiting potentiometer 118, a 25 kilohm resistance. Ramp limiting potentiometer 118 is connected between 12 volts and ground. Clamping diode 116 prevents the filtered output from the second stage amplifier from exceeding the preset voltage level on ramp limiting potentiometer 118 plus the forward voltage drop of clamping diode 116. The forward voltage drop of a silicon diode is typically 0.7 volts. Thus, the level at which the output of amplifier 96 is limited is approximately 0.7 volts above the voltage set on ramp limiting potentiometer 118. The output voltage of amplifier 96 appears across terminal 97 and is shown as FIG. 6.

The voltage level at which the output of amplifier 96 is limited depends upon the rotational loading device 18 as well as the torque producing device 22 under test. The level at which the output of amplifier 96 is limited should provide a control signal to rotational loading device 18 sufficient to stall the particular torque producing device 22 under test. When using a magnetic particle brake model B50 manufactured by Magnetic Power Systems, and testing a Desoutter air gun model 2F88-P, limiting the output of amplifier 96 to 2.5 volts was sufficient for the magnetic particle brake to stall the air gun.

After torque producing device 22 has stalled, the rotational loading device 18 control circuit is reset by depressing stop push button 32. Depressing stop push button 32 deenergizes indicating means 34 and relay 58. Denergizing relay 58 opens contact 60 and closes contact 62. Contact 60 opening deenergizes the seal that formerly maintained relay 58 in the energized state.

Closing contact 62 permits the charge stored on capacitor 88 to be dissipated. Resistor 86 limits the current flow through contact 62 to prevent welding of the contacts of contact 62.

With contact 62 closed a voltage appears at the negative input terminal of amplifier 94 as current flows from the +12 voltage source through ramp time potentiometer 92, resistor 90, resistor 86, closed contact 62 and resistor 98. It is this voltage that is offset by the dual adjustment of potentiometer 108.

Figure 7:
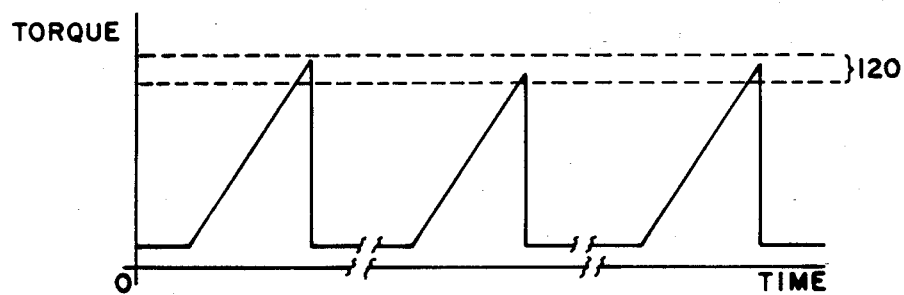
FIG. 7 is a series of typical torque curves produced by a rotational torque producing device as monitored by a recorder.

The rotational torque testing device of the present invention may be used by coupling air gun 22 to rotational loading device 18, securing the non-rotating portion of air gun 22, energizing torque producing device 22 under a no load condition, initiating the controlled loading of rotational loading device 18 and monitoring the torque produced by the rotational torque producing device 22 being tested. The dynamic test is performed repetitively on torque producing device 22 yielding a monitored torque signal as shown in FIG. 7. The dynamic test is repeated during calibration of torque producing device 22 until torque producing device 22 stalls within predetermined tolerance band 120 consistently, a predetermined number of times, typically 10. Calibrating torque producing device 22 under conditions simulating actual operating conditions in producing a mechanically rolled joint assures that torque producing device 22 will operate in a predictable manner until a subsequent calibration such that the integrity of a mechanically rolled joint rolled with a calibrated torque producing device 22 can be inferred from the stall torque.

What is claimed is:

1. Apparatus for dynamically testing a rotational torque device under conditions simulating actual operating conditions, the rotational torque device having a rotating portion and a relatively stationary portion, comprising:
    a rigidly supported load transducer means for sensing the torque produced by the rotational torque device being dynamically tested and for producing as an output a signal indicative of the torque developed by the rotational torque device;
    controllable loading means cooperatiely engaged with the load transducer means for coupling with the rotational torque device being dynamically tested and for applying a controlled load to the rotational torque device;
    means for initiating the loading of the controllable loading means;
    circuit means responsive to the initiating means for generating an intermediate control signal, the magnitude of which increases from an initial value at a constant, predetermined rate;
    circuit means for limiting the magnitude of the intermediate control signal thereby producing a magnitude limited control signal;
    buffer means for receiving the magnitude limited control signal and for controlling the loading on the controllable loading means therewith so as to gradually increase the loading; and
    means for monitoring the signal indicative of the torque produced by the rotational torque device being tested.

2. Apparatus for dynamically testing a rotational torque device under conditions simulating actual operating conditions as recited in claim 1 wherein the predetermined rate of increase of the intermediate control signal is adjustable.

3. Apparatus for dynamically testing a rotational torque device under conditions simulating actual operating conditions as recited in claim 1 wherein the initial value of the intermediate control signal corresponds to no load on the rotational torque device under test.

4. Apparatus for dynamically testing a rotational torque device under conditions simulating actual operating conditions as recited in claim 1 further comprising means for resetting the intermediate control signal to the initial value.

5. Apparatus for dynamically testing a rotational torque device under conditions simulating actual operating conditions as recited in claim 1 wherein the magnitude limited control signal is limited at a value which when applied to the controllable loading means as a control signal, results in a load on the rotational torque device under test that exceeds the stall torque thereof.

* * * * *